United States Patent
Oberheide et al.

(10) Patent No.: US 9,979,719 B2
(45) Date of Patent: May 22, 2018

(54) SYSTEM AND METHOD FOR CONVERTING ONE-TIME PASSCODES TO APP-BASED AUTHENTICATION

(71) Applicant: Duo Security, Inc., Ann Arbor, MI (US)

(72) Inventors: Jon Oberheide, Ann Arbor, MI (US); Adam Goodman, Ann Arbor, MI (US); Chris Czub, Ann Arbor, MI (US); Patrick Garrity, Ann Arbor, MI (US)

(73) Assignee: Duo Security, Inc., Ann Arbor, MI (US)

( * ) Notice: Subject to any disclaimer, the term of this patent is extended or adjusted under 35 U.S.C. 154(b) by 303 days.

(21) Appl. No.: 14/962,294

(22) Filed: Dec. 8, 2015

(65) Prior Publication Data
US 2016/0197914 A1 Jul. 7, 2016

Related U.S. Application Data

(60) Provisional application No. 62/100,203, filed on Jan. 6, 2015.

(51) Int. Cl.
*G06F 21/00* (2013.01)
*H04L 29/06* (2006.01)
*H04W 12/04* (2009.01)

(52) U.S. Cl.
CPC ...... *H04L 63/0838* (2013.01); *H04L 63/0853* (2013.01); *H04L 63/0869* (2013.01); *H04L 63/18* (2013.01); *H04W 12/04* (2013.01)

(58) Field of Classification Search
CPC . H04L 63/0838; H04L 63/18; H04L 63/0853; H04L 63/0869; H04W 12/04
See application file for complete search history.

(56) References Cited

U.S. PATENT DOCUMENTS

| | | |
|---|---|---|
| 5,838,792 A | 11/1998 | Ganesan |
| 5,870,723 A | 2/1999 | Pare et al. |
| 6,119,096 A | 9/2000 | Mann et al. |
| 6,209,091 B1 | 3/2001 | Sudia et al. |
| 6,311,272 B1 | 10/2001 | Gressel |
| 6,694,025 B1 | 2/2004 | Epstein et al. |
| 6,758,394 B2 | 7/2004 | Maskatiya et al. |

(Continued)

OTHER PUBLICATIONS

Goldfeder et al., Securing Bitcoin wallets via a new DSA/ECDSA threshold signature scheme, http://www.cs.princeton.edu/~stevenag/threshold_sigs.pdf.

(Continued)

*Primary Examiner* — Kendall Dolly
(74) *Attorney, Agent, or Firm* — Jeffrey Schox; Padowithz Alce (57) ABSTRACT

A method comprising includes detecting, in response to a user access attempt on an electronic access device, a one-time passcode authentication event; receiving, at an electronic authenticating device, notification of the one-time passcode authentication event; retrieving, in response to the notification, a one-time passcode from the authenticating device; transmitting the one-time passcode from the authenticating device to a facilitator software instance operating on the access device; and enabling population, using the facilitator software instance, of a one-time passcode entry form with the one-time passcode.

17 Claims, 6 Drawing Sheets

(56) References Cited

U.S. PATENT DOCUMENTS

| | | |
|---|---|---|
| 6,823,359 B1 | 11/2004 | Heidingsfeld et al. |
| 6,934,858 B2 | 8/2005 | Woodhill |
| 6,956,950 B2 | 10/2005 | Kausik |
| 6,996,716 B1 | 2/2006 | Hsu |
| 7,096,354 B2 | 8/2006 | Wheeler et al. |
| 7,331,518 B2 | 2/2008 | Rable |
| 7,340,600 B1 | 3/2008 | Corella |
| 7,386,720 B2 | 6/2008 | Sandhu et al. |
| 7,447,784 B2 | 11/2008 | Eun |
| 7,463,637 B2 | 12/2008 | Bou-Diab et al. |
| 7,496,662 B1 | 2/2009 | Roesch et al. |
| 7,526,792 B2 | 4/2009 | Ross |
| 7,562,382 B2 | 7/2009 | Hinton et al. |
| 7,574,733 B2 | 8/2009 | Woodhill |
| 7,711,122 B2 | 5/2010 | Allen et al. |
| 7,752,450 B1 * | 7/2010 | Palmer .................. G06F 21/31 713/183 |
| 7,793,110 B2 | 9/2010 | Durfee et al. |
| 7,953,979 B2 | 5/2011 | Borneman et al. |
| 7,982,595 B2 | 7/2011 | Hanna et al. |
| 8,028,329 B2 | 9/2011 | Whitcomb |
| 8,136,148 B1 | 3/2012 | Chayanam et al. |
| 8,161,527 B2 | 4/2012 | Curren |
| 8,200,980 B1 | 6/2012 | Robinson et al. |
| 8,245,044 B2 | 8/2012 | Kang |
| 8,332,627 B1 | 12/2012 | Matthews et al. |
| 8,335,933 B2 | 12/2012 | Humphrey et al. |
| 8,397,301 B2 | 3/2013 | Hering et al. |
| 8,402,526 B2 | 3/2013 | Ahn |
| 8,458,798 B2 | 6/2013 | Williams et al. |
| 8,495,720 B2 | 7/2013 | Counterman |
| 8,499,339 B2 | 7/2013 | Chao et al. |
| 8,510,820 B2 | 8/2013 | Oberheide et al. |
| 8,538,028 B2 | 9/2013 | Yeap et al. |
| 8,539,567 B1 | 9/2013 | Logue et al. |
| 8,627,438 B1 | 1/2014 | Bhimanaik |
| 8,646,060 B1 | 2/2014 | Ayed |
| 8,646,086 B2 | 2/2014 | Chakra et al. |
| 8,689,287 B2 | 4/2014 | Bohmer et al. |
| 8,700,729 B2 | 4/2014 | Dua |
| 8,732,475 B2 | 5/2014 | Fahrny et al. |
| 8,732,839 B2 | 5/2014 | Hohl |
| 8,745,703 B2 | 6/2014 | Lambert et al. |
| 8,763,077 B2 | 6/2014 | Oberheide et al. |
| 8,769,643 B1 * | 7/2014 | Ben Ayed ............ H04W 12/06 726/5 |
| 8,806,609 B2 | 8/2014 | Gladstone et al. |
| 2,639,997 A1 | 9/2014 | Wiesmaier et al. |
| 8,850,516 B1 | 9/2014 | Hrebicek et al. |
| 8,891,772 B2 | 11/2014 | D Souza et al. |
| 8,893,230 B2 | 11/2014 | Oberheide et al. |
| 8,898,762 B2 | 11/2014 | Kang |
| 9,049,011 B1 | 6/2015 | Agrawal |
| 9,223,961 B1 | 12/2015 | Sokolov |
| 9,282,085 B2 | 3/2016 | Oberheide et al. |
| 9,391,980 B1 | 7/2016 | Krahn et al. |
| 2002/0013898 A1 | 1/2002 | Sudia et al. |
| 2002/0123967 A1 | 9/2002 | Wang |
| 2002/0136410 A1 | 9/2002 | Hanna |
| 2003/0061506 A1 | 3/2003 | Cooper et al. |
| 2003/0115452 A1 | 6/2003 | Sandhu et al. |
| 2003/0120931 A1 | 6/2003 | Hopkins et al. |
| 2003/0126472 A1 | 7/2003 | Banzhof |
| 2003/0147536 A1 | 8/2003 | Andivahis et al. |
| 2004/0064706 A1 | 4/2004 | Lin et al. |
| 2004/0218763 A1 | 11/2004 | Rose et al. |
| 2005/0218215 A1 | 10/2005 | Lauden |
| 2005/0221268 A1 | 10/2005 | Chaar et al. |
| 2005/0240522 A1 | 10/2005 | Kranzley et al. |
| 2005/0268107 A1 | 12/2005 | Harris et al. |
| 2006/0031938 A1 | 2/2006 | Choi |
| 2006/0059569 A1 | 3/2006 | Dasgupta et al. |
| 2006/0130139 A1 | 6/2006 | Sobel et al. |
| 2006/0165060 A1 | 7/2006 | Dua |
| 2006/0182276 A1 | 8/2006 | Sandhu et al. |
| 2006/0184788 A1 | 8/2006 | Sandhu et al. |
| 2006/0242692 A1 | 10/2006 | Thione et al. |
| 2007/0016948 A1 | 1/2007 | Dubrovsky et al. |
| 2007/0081667 A1 | 4/2007 | Hwang |
| 2007/0156592 A1 * | 7/2007 | Henderson ............ G06Q 10/06 705/51 |
| 2007/0156659 A1 | 7/2007 | Lim |
| 2007/0186106 A1 | 8/2007 | Ting et al. |
| 2007/0199060 A1 | 8/2007 | Touboul |
| 2007/0228148 A1 | 10/2007 | Rable |
| 2007/0250914 A1 | 10/2007 | Fazal |
| 2007/0258594 A1 | 11/2007 | Sandhu et al. |
| 2007/0284429 A1 | 12/2007 | Beeman |
| 2007/0297607 A1 | 12/2007 | Ogura et al. |
| 2008/0049642 A1 | 2/2008 | Gudipudi et al. |
| 2008/0069347 A1 | 3/2008 | Brown et al. |
| 2008/0120411 A1 | 5/2008 | Eberle |
| 2008/0229104 A1 | 9/2008 | Ju et al. |
| 2009/0055906 A1 | 2/2009 | Wendorff |
| 2009/0077060 A1 | 3/2009 | Sermersheim et al. |
| 2009/0167489 A1 | 7/2009 | Nan et al. |
| 2009/0187986 A1 | 7/2009 | Ozeki |
| 2009/0198997 A1 | 8/2009 | Yeap et al. |
| 2009/0210705 A1 | 8/2009 | Chen |
| 2009/0271863 A1 | 10/2009 | Govindavajhala et al. |
| 2009/0300596 A1 | 12/2009 | Tyhurst et al. |
| 2009/0300707 A1 | 12/2009 | Garimella et al. |
| 2010/0023781 A1 | 1/2010 | Nakamoto |
| 2010/0042954 A1 | 2/2010 | Rosenblatt et al. |
| 2010/0069104 A1 | 3/2010 | Neil et al. |
| 2010/0100725 A1 | 4/2010 | Ozzie et al. |
| 2010/0114740 A1 | 5/2010 | Dominguez et al. |
| 2010/0115578 A1 | 5/2010 | Nice et al. |
| 2010/0121767 A1 | 5/2010 | Coulter et al. |
| 2010/0125737 A1 | 5/2010 | Kang |
| 2010/0131755 A1 | 5/2010 | Zhu et al. |
| 2010/0180001 A1 | 7/2010 | Hardt |
| 2010/0202609 A1 | 8/2010 | Sandhu et al. |
| 2010/0216425 A1 | 8/2010 | Smith |
| 2010/0217986 A1 | 8/2010 | Schneider |
| 2010/0233996 A1 | 9/2010 | Herz et al. |
| 2010/0257610 A1 | 10/2010 | Hohl |
| 2010/0263021 A1 | 10/2010 | Arnott et al. |
| 2010/0274859 A1 | 10/2010 | Bucuk |
| 2010/0330969 A1 | 12/2010 | Kim et al. |
| 2011/0026716 A1 | 2/2011 | Tang et al. |
| 2011/0086616 A1 | 4/2011 | Brand et al. |
| 2011/0107389 A1 | 5/2011 | Chakarapani |
| 2011/0113484 A1 | 5/2011 | Zeuthen |
| 2011/0119765 A1 | 5/2011 | Hering et al. |
| 2011/0138469 A1 | 6/2011 | Ye et al. |
| 2011/0145900 A1 | 6/2011 | Chern |
| 2011/0197266 A1 * | 8/2011 | Chu .................... H04L 9/3228 726/5 |
| 2011/0197267 A1 | 8/2011 | Gravel et al. |
| 2011/0219449 A1 | 9/2011 | St. Neitzel et al. |
| 2011/0277025 A1 | 11/2011 | Counterman |
| 2011/0302410 A1 | 12/2011 | Clarke et al. |
| 2011/0302630 A1 | 12/2011 | Nair et al. |
| 2012/0063601 A1 | 3/2012 | Hart |
| 2012/0090028 A1 | 4/2012 | Lapsley et al. |
| 2012/0096274 A1 | 4/2012 | Campagna et al. |
| 2012/0198050 A1 | 8/2012 | Maki et al. |
| 2012/0198228 A1 | 8/2012 | Oberheide et al. |
| 2012/0216239 A1 | 8/2012 | Yadav et al. |
| 2012/0227098 A1 | 9/2012 | Obasanjo et al. |
| 2012/0290841 A1 | 11/2012 | Jentzsch |
| 2012/0300931 A1 | 11/2012 | Ollikainen et al. |
| 2013/0042002 A1 | 2/2013 | Cheeniyil et al. |
| 2013/0060708 A1 | 3/2013 | Oskolkov et al. |
| 2013/0081101 A1 | 3/2013 | Baer et al. |
| 2013/0091544 A1 * | 4/2013 | Oberheide ............ G06F 21/34 726/1 |
| 2013/0097585 A1 | 4/2013 | Jentsch et al. |
| 2013/0110676 A1 | 5/2013 | Kobres |
| 2013/0117826 A1 | 5/2013 | Gordon et al. |
| 2013/0124292 A1 | 5/2013 | Juthani |
| 2013/0125226 A1 | 5/2013 | Shah et al. |
| 2013/0174246 A1 | 7/2013 | Schrecker et al. |

(56) References Cited

U.S. PATENT DOCUMENTS

| | | |
|---|---|---|
| 2013/0179681 A1 | 7/2013 | Benson et al. |
| 2013/0239167 A1 | 9/2013 | Sreenivas et al. |
| 2013/0239168 A1 | 9/2013 | Sreenivas et al. |
| 2013/0239177 A1 | 9/2013 | Sigurdson et al. |
| 2013/0246281 A1 | 9/2013 | Yamada et al. |
| 2013/0263211 A1 | 10/2013 | Neuman et al. |
| 2013/0310006 A1 | 11/2013 | Chen et al. |
| 2013/0326224 A1 | 12/2013 | Yavuz |
| 2013/0326493 A1 | 12/2013 | Poonamalli et al. |
| 2014/0019752 A1 | 1/2014 | Yin et al. |
| 2014/0047546 A1 | 2/2014 | Sidagni |
| 2014/0181517 A1 | 6/2014 | Alaranta et al. |
| 2014/0181520 A1 | 6/2014 | Wendling et al. |
| 2014/0188796 A1 | 7/2014 | Fushman et al. |
| 2014/0201841 A1 | 7/2014 | Deshpande et al. |
| 2014/0208405 A1 | 7/2014 | Hashai |
| 2014/0235230 A1 | 8/2014 | Raleigh |
| 2014/0237236 A1 | 8/2014 | Kalinichenko et al. |
| 2014/0244993 A1 | 8/2014 | Chew |
| 2014/0245278 A1 | 8/2014 | Zellen |
| 2014/0245396 A1 | 8/2014 | Oberheide et al. |
| 2014/0247140 A1 | 9/2014 | Proud |
| 2014/0351954 A1 | 11/2014 | Brownell et al. |
| 2014/0376543 A1 | 12/2014 | Malatack et al. |
| 2015/0012914 A1 | 1/2015 | Klein et al. |
| 2015/0026461 A1 | 1/2015 | Devi |
| 2015/0237026 A1 | 8/2015 | Kumar |
| 2015/0242643 A1 | 8/2015 | Hankins et al. |
| 2016/0056962 A1 | 2/2016 | Mehtala |
| 2016/0080366 A1* | 3/2016 | Agarwal ............. H04L 63/0838 726/6 |
| 2016/0164866 A1 | 6/2016 | Oberheide et al. |
| 2016/0180072 A1 | 6/2016 | Ligatti et al. |
| 2016/0212129 A1* | 7/2016 | Johnston ................. G06F 21/73 |
| 2016/0286391 A1 | 9/2016 | Khan |

OTHER PUBLICATIONS

Symantec, Administration guide for symantec Endpoint protection and symantec network access control, 2009, version 11.00.05.00.00.

Edge, Kenneth, et al. "The use of attack and protection trees to analyze security for an online banking system." System Sciences, 2007. HICSS 2007. 40th Annual Hawaii International Conference on. IEEE, 2007.

Neuenhofen, Kay, and Mathew Thompson. "A secure marketplace for mobile java agents." Proceeding of the second international Conference on Autonomous agents. ACM, 1998. (pp. 212-218).

Simske et al., "APEX: Automated Policy Enforcement eXchange", Sep. 21-24, 2010, ACM, pp. 139-142.

Symantec, Administration Guide for Symantec TM Endpoint Protection and Symantec Network Access Control, Aug. 1, 2007.

* cited by examiner

SYSTEM AND METHOD FOR CONVERTING ONE-TIME PASSCODES TO APP-BASED AUTHENTICATION

CROSS-REFERENCE TO RELATED APPLICATIONS

This application claims the benefit of U.S. Provisional Application Ser. No. 62/100,203, filed on Jan. 6, 2015, which is incorporated in its entirety by this reference.

TECHNICAL FIELD

This invention relates generally to the authentication field, and more specifically to a new and useful system and method for converting one-time passcodes to app-based authentication in the authentication field.

BACKGROUND

Passwords are easily phished, captured, replayed, or otherwise compromised. To address weaknesses in passwords, two-factor authentication was developed and is commonly deployed by websites and companies. Most two-factor authentication operates by adding an additional security challenge after prompting a user for primary password-based authentication.

One model of two-factor authentication is one-time passcodes (OTPs). In this model, the user employs an OTP-generating device to generate a short, user friendly passcode (usually 6 or 8 numeric digits) and provides that passcode to the validating service (usually by typing it in to an input box).

The OTP-generating device and the validating server both share a secret and employ an algorithm that allows them to agree upon what passcode to expect. OATH HOTP and TOTP are two open standards for OTP-based authentication.

Each passcode can only be used once and every time the user goes to log in, their OTP-generating device will generate a new and different passcode. So while attackers may still compromise/phish a user's static password, if they capture/observe an OTP, it can only be used once and not replayed at a later time. Use of OTP authentication passcodes, however, can be cumbersome from a usability perspective. While OTP-based authentication offers security gains, the usability of a human transcribing an ever-changing passcode (often racing a countdown timer in time-based OTPs) from one device to another leaves much to be desired.

Thus, there is a need in the authentication field to create a new and useful system and method for converting one-time passcodes to app-based authentication. This invention provides such a new and useful system and method.

DESCRIPTION OF THE PREFERRED EMBODIMENTS

The following description of preferred embodiments of the invention is not intended to limit the invention to these preferred embodiments, but rather to enable any person skilled in the art to make and use this invention.

The system and method for converting one-time passcodes (OTPs) to app-based authentication of preferred embodiments functions to transparently overlay app-based interactions for the user on top of OTP authentication of an outside services. The system and method can offer a user experience that includes just tapping an approval button within an app when attempting to login to outside services with OTP authentication. While, app-based authentication is used for approaches such as two-factor authentication (2FA), such options are not always offered. Such push-based notifications authentication is dependent on outside services to build such functionality into the authentication. Outside services can include websites, applications, internal enterprise solutions, or any suitable computer system with an authentication process. If an outside service only offers an OTP authentication option, a user could be traditionally limited to only having the option of OTP. However, the system and method can be automatically applied to an outside service OTP authentication process independent of integration setup by the outside service.

The system and method use facilitator software such as a browser extension in combination with an OTP app to provide the more usable OTP authentication process. As shown in FIGS. 1-4 the system and method can be applied to various system architectures to adapt to various scenarios such as SMS delivered OTPs, Bluetooth or near field communication transfer of OTP, or applying the system and method to non-OTP authentication such as primary credentials.

1. System for Converting One-Time Passcodes to App-Based Authentication

Figure 2:
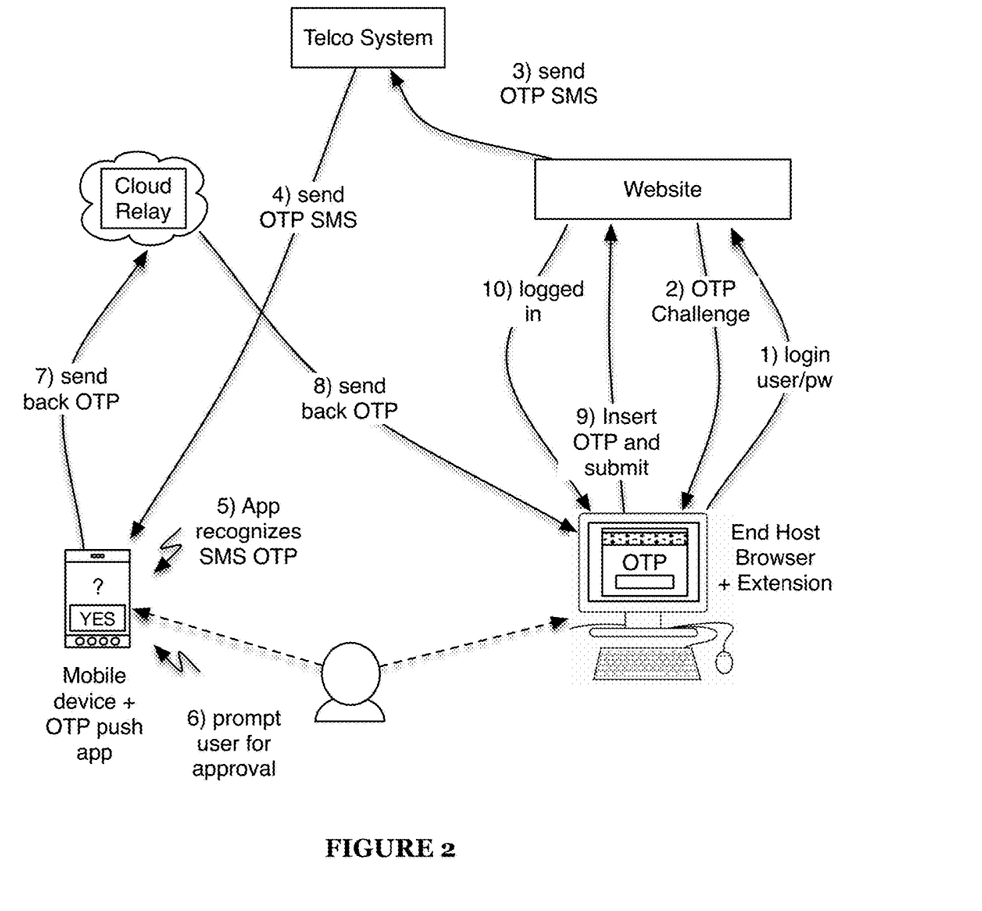
FIG. 2 is a schematic flow diagram of a variation of a method of a preferred embodiment applied to SMS/MMS delivered OTPs.
Figure 3:
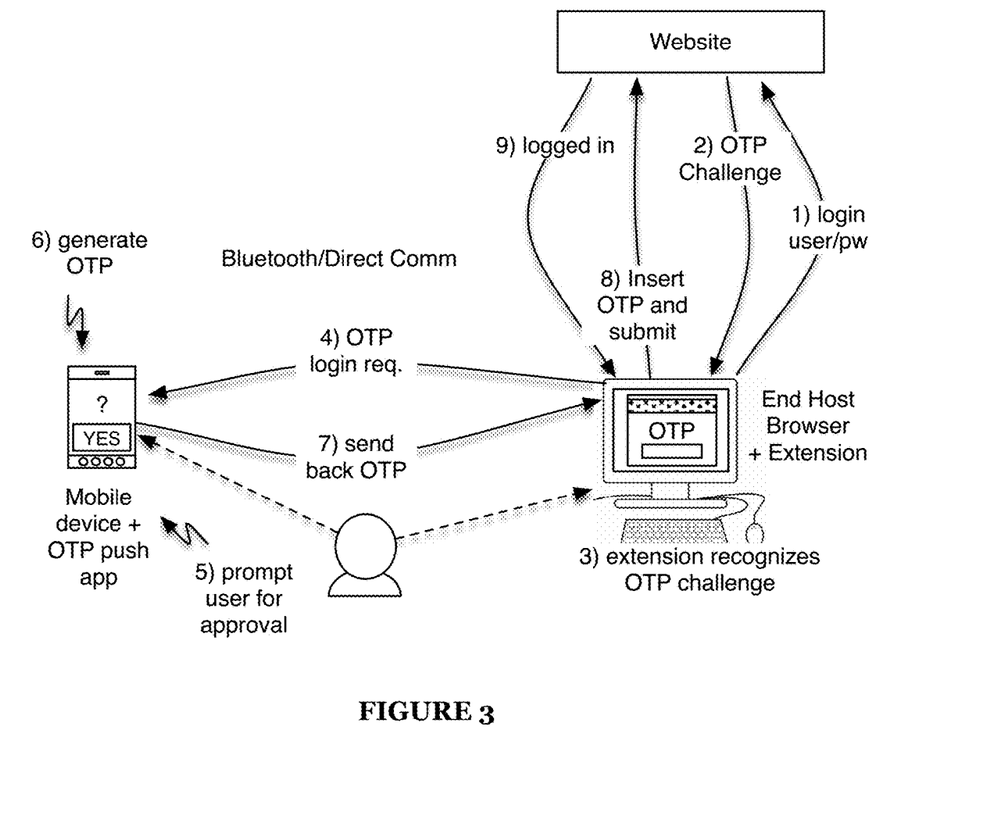
FIG. 3 is a schematic flow diagram of a variation of a Bluetooth variation of method of a preferred embodiment.
Figure 4:
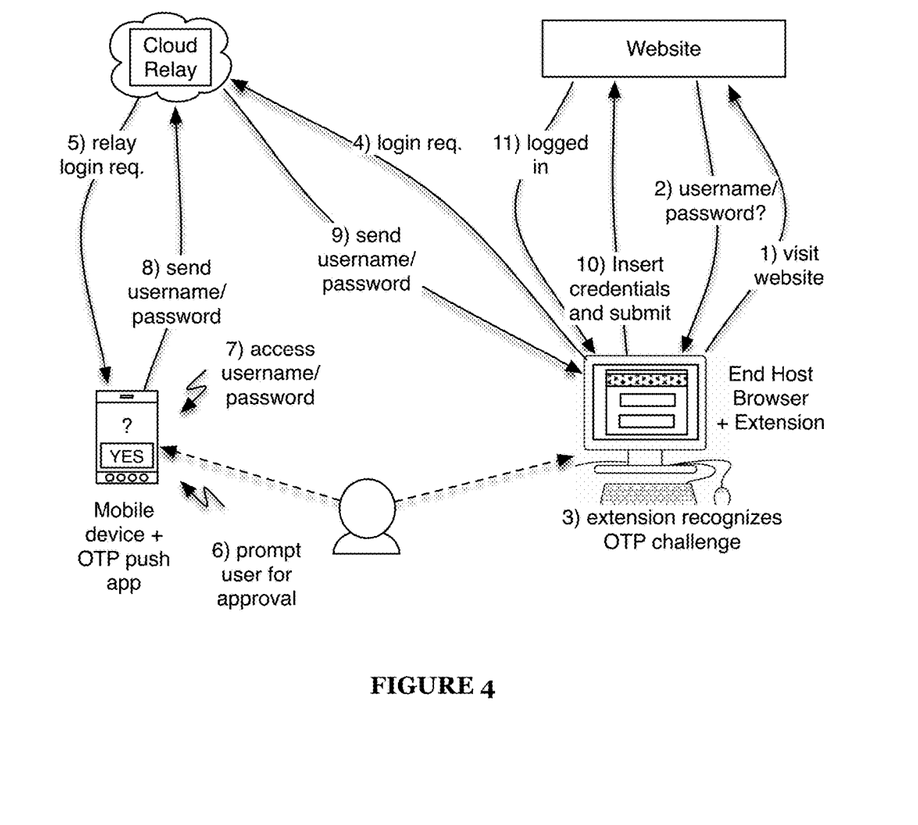
FIG. 4 is a schematic flow diagram of a primary credential variation of a preferred embodiment.

As shown in FIGS. 1-4 a system of a preferred embodiment can include facilitator software (e.g., a host extension) and a one-time passcode generating app (e.g., an OTP app). The system functions to automatically detect authentication events and then initiate completion of the authentication process facilitated through an OTP app. The system is preferably used for transparently converting OTP requests into an app-based approval process. The system may alternatively be applied to facilitating completion of other factors of authentication. As shown in FIG. 4, the system can be used in completing primary username/password credentials. The system can similarly be applied to completing security questions, entering private keys, credit card numbers, account information or other secured information.

The facilitator software functions as the monitor and facilitator of authentication completion. The facilitator software preferably facilitates in the initial identification and initiation of converting an OTP authentication process and in transparently completing the OTP authentication with an outside service. The facilitator software is preferably an application, plugin, an extension, or any suitable executable component on a host device (also referred to as an access device). An access device is a computing device used in accessing an outside service such as a desktop computer, a mobile phone, a tablet, a connected television, a gaming system, wearable computer, ATM machine, or any suitable computing device. In a preferred variation the facilitator software is a browser extension that can be activated when accessing a website of an outside service. The facilitator software may alternatively be a native application or any suitable application, background host service, or other suitable executable component.

The facilitator software preferably monitors access of at least one client application on the host, such as a browser. The facilitator software can additionally monitor interactions of multiple client applications such as monitoring application interactions on a mobile operating system. The facilitator software can be configured to detect an OTP request event of an outside service. In one variation, the facilitator software includes pre-configured OTP request detection rules designed for specific outside services or for basic OTP request patterns. Alternatively, a user may manually activate the facilitator software when an OTP request event is present. The facilitator software may alternatively automatically detect OTP events. An outside service could additionally follow special protocols to indicate that an OTP event is occurring. In many cases, an OTP event will include text or some copy that communicates that a user needs to enter an OTP code in an input field to complete a transaction (e.g., to complete login). In one variation, the facilitator software can augment the interface of the outside service to hide OTP copy and input fields and provide copy providing instructions for the app-based interactions.

Once an OTP event is detected, the facilitator software may initiate communication to notify an OTP app instance associated with the user. A facilitator software is preferably associated with a single entity. Alternatively, there can be multiple entities, and the facilitator software may ask which entity should be used when delivering the OTP. When the OTP request is successfully approved within the OTP app, the OTP app may communicate a generated or received OTP to the facilitator software. The facilitator software then enables submission of the OTP to the outside service and the transaction can be completed appropriately. For example, the facilitator software can automatically fill in an OTP text field and submit the form to be posted to the server of the website.

Figure 5:
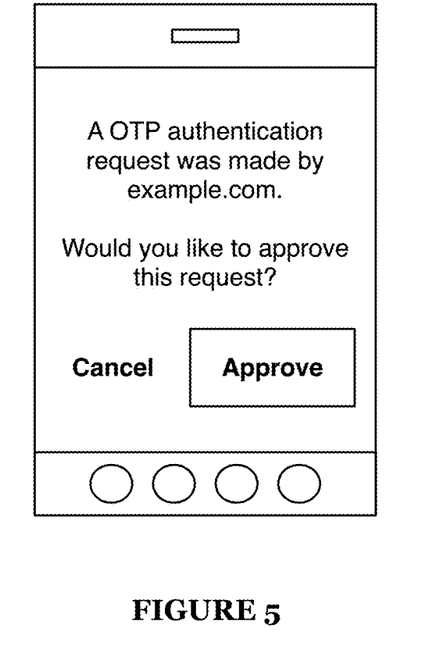
FIG. 5 is a schematic representation of an exemplary interface of an OTP app.

The OTP app functions to be a notification-based application that uses basic user approval to complete and communicate generated OTPs. As shown in FIG. 5, an OTP app can include an interface activated during the OTP authentication process that notifies the user of the transaction and asks for approval. OTP generation and communication is preferably transparent to the user. An OTP app is preferably an application that can be installed on a managed device of a user (also referred to as an authentication device) as an OTP app instance. Each OTP app instance is preferably associated with an individual entity (e.g., user). An OTP app instance is preferably synchronized with at least one facilitator software instance. Synchronizing may include the facilitator software displaying a QR code encoding a token, entering specified tokens, logging into an account for both the OTP app instance and a facilitator software instance. Additionally, there may be multiple OTP app instances for a single entity and additionally or alternatively multiple facilitator software instances for a single entity. For example, an OTP app may be installed and setup on a mobile phone, tablet and desktop computer for a first user. The first user may additionally have the facilitator software installed for two different browsers on one device and on another browser of a second device.

The OTP app preferably includes an OTP generator component. The OTP generator generates a one-time password. The OTP generator component may need to be setup for an outside service. The outside service preferably includes an OTP generator setup process through which a seed token or other parameters are setup the OTP generator to generate passcodes for the account of the outside service. The OTP app may be used for multiple outside services, and so OTP generator components can be setup for different services/account pairs.

In one variation, the outside service may not depend on OTP generators and will transmit an OTP to an account-paired device. For example, after providing username and password, a website may send an OTP passcode through an SMS message. In this variation, the facilitator software may not initiate any actions. The OTP app preferably detects an OTP received on the app and can automatically trigger the OTP app to be activated so that a simple user-interface interaction is offered.

The OTP app and the facilitator software preferably have at least one available communication channel. In a one variation, the system can additionally include a cloud-based relay system, which functions to act as a central resource that can manage communications between facilitator software and OTP apps. In one variation, network communication of the OTP is preferably performed with end-to-end encryption such that preferably the OTP app and the facilitator software are the two entities privileged to read the OTP message. In one variation, there is an initial setup process for the OTP app and the facilitator software that synchronizes cryptographic keys between the OTP and the facilitator software. For example, when setting up the facilitator software, a QR code (or other suitable token) may be presented that is transferred onto the OTP app. In another variation, the communication channel may be a local communication channel such as over Bluetooth or a local network as shown in FIG. 3. If the communication channel between the facilitator software and the OTP app is not functioning, the OTP app can still generate an OTP and a user may manually enter the OTP.

2. Method for Converting One-Time Passcodes to App-Based Authentication

Figure 6:
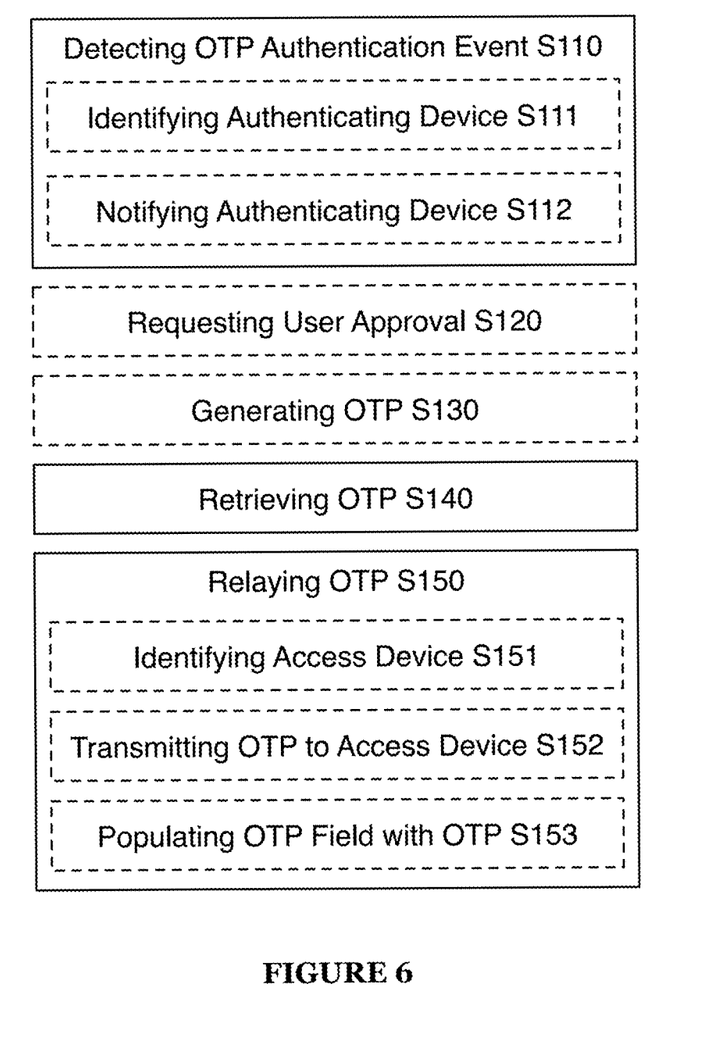
FIG. 6 is a chart representation of a method of a preferred embodiment.

As shown in FIG. 6, a method 100 for converting one-time passcodes to app-based authentication preferably includes detecting an OTP authentication event associated with an outside service S110, retrieving an OTP from an authenticating device S140, and relaying the OTP to the outside service S150. The method 100 may additionally or alternatively include requesting user approval S120, and/or generating an OTP S130.

The method 100 functions to automatically detect authentication events and then initiate completion of the authentication process facilitated through an OTP app. The method 100 is preferably used for transparently converting OTP requests into an app-based approval process, but may additionally or alternatively be applied to completing security questions or other factors of authentication.

The method 100 is preferably operable on one or more devices including an access device (i.e., a device used to access an outside service) and an authenticating device (a device to which an OTP is generated and/or to which an OTP is sent). In some cases, the authenticating device and access device may be the same device (e.g., a web browser of a smartphone is used to access an outside service; a text containing an OTP is sent to the phone number associated with that smartphone).

The method 100 can additionally include various processes in configuring and setting up the system. An OTP app instance is preferably installed on at least one device of a user. Facilitator software (e.g., an extension of application) is installed for at least one application (e.g., a browser) or computing environment (e.g., operating system). The facilitator software is preferably paired with at least one OTP app instance, which functions to establish a communication channel for relaying OTP request notifications and OTP information. Additionally, the OTP app may setup an OTP generator for use with an outside service. For example, an OTP seed value may be provided by the outside service and configured in the OTP app.

In one variation, the facilitator software can facilitate automatic OTP enrollment and setup for a compatible outside service. Automatic enrollment can include the facilitator software detecting when a user logs into a website that supports OTP-based two-factor authentication; automatically activating the OTP 2FA on the website; extracting the OTP seed material provided in the website such as by extracting the seed material from a provided QR code; and transparently relaying the seed material to the OTP app instance of the user.

S110 includes detecting an OTP authentication event associated with an outside service. S110 functions to identify when an OTP is or will be requested during an authentication event.

S110 may include detecting an OTP authentication event on the access device, on the authenticating device, or on any other device.

In one implementation of a preferred embodiment, S110 includes detecting the OTP authentication event on the authenticating device. S110 may include detecting this event using any software operating on the authenticating device, including a native application (e.g., the OTP app), the operating system of the authenticating device, and/or web applications operating on the authenticating device. In this implementation, S110 may include detecting the OTP authentication event in any manner. For example, S110 may include monitoring incoming communications to the authenticating device (e.g., SMS messages, MMS messages, push notifications, emails, etc.) and analyzing those communications for OTP authentication information (e.g., content, sender, send time, receive time, etc.). S110 may additionally or alternatively include monitoring other information that may indicate or be correlated to OTP authentication events (e.g., monitoring application usage, such as a user opening an OTP generator application, or manually detecting an OTP auth. event, such as a user opening the OTP app and indicating that an OTP auth. event has occurred or will occur).

In another implementation of a preferred embodiment, S110 includes detecting the OTP authentication event on the access device. S110 preferably includes detecting this event using facilitator software, but may include detecting this event using any software operating on the access device, including a native application, an extension or plugin for an application (e.g., a browser extension), the operating system of the access device, and/or web applications operating on the access device. In this implementation, S110 may include detecting the OTP authentication event in any manner. For example, S110 may include monitoring a user's web browser usage on the access device and analyzing web page content (e.g., text, images) and/or URLs to detect OTP authentication events.

Web content may be analyzed in a number of ways. For example, particular words related to OTP events in general may be detected (e.g., "one-time passcode"), and/or content related to a specific service or company that may require OTP authentication may be detected. In some cases, S110 may include processing content against a recognition database (e.g., checking a URL to see if that URL is associated with a service that may request an OTP password). As another example, S110 may include detecting the OTP authentication event by using words associated with a particular user account known to be linked with OTP-based two-factor authentication. For example, S110 may include detecting a particular username or password entered by a user (in this case, detection may occur by monitoring web usage, but may additionally or alternatively occur by monitoring keyboard entries, allowing for detection of OTP events occurring for services using native apps to process logins).

S110 may alternatively include receiving user prompting of an OTP event (e.g., a user may press a button in a host extension that notifies the host extension that an OTP event has occurred or will occur).

If S110 includes detecting the OTP authentication event on the access device (or on any other device other than the authenticating device), S110 may additionally including identifying the authenticating device S111 and/or notifying the authenticating device S112.

S111, identifying the authenticating device, functions to retrieve information pertaining to the authenticating device (enabling the device to be notified). S111 preferably includes identifying the authenticating device using user information pre-stored in the facilitator software, but may additionally or alternatively include identifying the authenticating device in any manner.

For example, S111 may include identifying an authenticating device by prompting a user to select from a set of authenticating device profiles stored either in the facilitator software or in a cloud database linked to the facilitator software. As another example, S111 may include identifying an authenticating device by collecting the login name entered by a user into the access device, as well as the domain of the webpage for which access is attempted, and retrieving the appropriate authenticating device profile from local and/or remote storage linked with the facilitator software.

S111 may alternatively include identifying the authenticating device using information provided by the application and/or webpage for which authentication is requested. For example, S111 may include detecting text on a webpage stating "a text message containing an OTP has been sent to 555-867-5309", and recognize that the authenticating device is associated with that number.

S111 may alternatively include identifying the authenticating device by asking for manual user input (e.g., "Please input the phone number to which the OTP was texted").

S111 may include identifying additional information pertaining to the authenticating device; for example, if the authenticating device uses an OTP generating application having a particular seed and algorithm, S111 may include identifying the application, seed, and/or algorithm. As another example, S111 may include identifying a particular instance of an OTP app used by the authenticating device. Likewise, S111 may include identifying a preferred method of notifying the authenticating device (discussed in S112).

S112, notifying the authenticating device, functions to send notification of the OTP authentication event from the access device (or other device) to the authenticating device. S112 preferably includes notifying the authenticating device using a method of notification identified in S111. The method of notification may include notification type (e.g., e-mail, push notification, SMS message) and/or notification vector (e.g., internet via cloud relay, directly over Bluetooth, over cellular network, etc.).

S112 may additionally include transmitting any data relevant to the OTP authentication event; for example, any data identified in S110 or S111 (e.g., outside service identity, user identity, OTP algorithm, OTP seed, etc.). S112 may also include transmitting data about the access device that initiated the OTP authentication event (e.g., device instance identifier, facilitator software identifier, IP address, MAC address, etc.).

In general, S112 may include transmitting OTP retrieval information; that is, information indicating how an OTP is to be retrieved (e.g., from a text message, from a push notification, from the OTP app after generating the OTP, from an external OTP generating app, etc.)

In one example, S112 includes sending an application layer communication from a host extension of the access device to a remote computing system (e.g., a cloud-based authentication platform. An application layer communication can be an HTTP-based communication (e.g., HTTP or HTTPs), SPDY communication, or other suitable communication.

Note that in this and in other examples S111 and S112 may be performed in any order and/or at least partially concurrently. For example, a host extension may collect or use pre-stored user information to generate a transmission to a cloud-based authentication platform, which uses the user information to identify an authenticating device, and then sends a notification to the authenticating device.

S120 includes requesting user approval. S120 functions to collect user approval, preferably using a user interface on the authenticating device, to confirm that the OTP authentication event is legitimate.

S120 is preferably performed using the OTP app, but may additionally or alternatively be performed using any suitable method. For example, the OTP app may be notified through a push transmission sent to the OTP app from a cloud platform. In response, the OTP app may display an approval request to an authenticating device user. This request may include any relevant information pertaining to the OTP authentication event and/or a mechanism for user response. For example, when a user attempts to login to a Company ABC, the OTP app can present a view stating, "A login attempt was made at Company ABC. Would you like to approve?" The OTP app can display an approve option, a cancel option, a report fraud option, and/or any suitable option.

S120 may include receiving user approval in any manner, for example; by entry of a static passcode, by providing biometric authentication (e.g., scanning fingerprint), or performing any suitable act (e.g., completing a puzzle, touching an approval button or other selectable approval indicator, etc.). If user approval is denied, the OTP app (or other software) can communicate this result to the host extension (or other facilitator software) and the cancelation can be communicated within the host extension, by submitting a wrong OTP, or by inserting a cancelation message into the current view of the outside system. Alternatively (or if an option indicating fraud or other intentional unauthorized access is selected), S120 may include sending details of the authentication event to a security platform, to the outside service, and/or to authorities. Likewise, S120 may include presenting users with options to take action against unauthorized access (e.g., automatically locking or resetting user credentials via the OTP app).

S120 may alternatively include receiving user approval implicitly; e.g., by presenting a prompt to deny authorization within a certain time-frame and automatically approving authorization if that time-frame expires without a denial of authorization. As another example, S120 may include automatically giving user approval given certain characteristics of the authenticating device; for example, S120 may include automatically giving user approval when the authenticating device and access device are within a certain distance of each other and both devices are within a particular region (e.g., within a particular secure office building).

S130 includes generating an OTP. S130 functions to generate an OTP for an OTP authentication event using an OTP algorithm to produce an OTP for the authentication transaction. S130 is preferably performed in response to approval (via S120) but may additionally or alternatively be performed at any time. Generating an OTP can include using OATH HOTP (HMAC-based One Time Password), TOTP (Time-based One Time Password), or any suitable process.

S130 is preferably performed by an OTP app on the authenticating device, but may additionally or alternatively be performed on any device. For example, S130 may include generating the OTP at a cloud-based platform and transmitting the OTP to the authenticating device.

S130 may include identifying OTP generation parameters (which may be useful in cases where an OTP app is used for multiple outside services, for example). OTP generation parameters may include OTP generator instance, OTP generation algorithm, OTP seed, etc. S130 preferably includes identifying OTP generation parameters using data received in S110, but may additionally or alternatively include identifying OTP generation parameters in any manner. For example, S130 may include receiving indication to use "OTP Generator 3" of the OTP App (which is associated with a particular algorithm and seed) via S112. As another example, S130 may include receiving a notification containing an OTP seed and algorithm (preferably in encrypted form), and establishing an OTP generator instance using this information. As a third example, S130 may include receiving OTP generation parameters from an outside service or directly from a user.

S140 includes retrieving the OTP. S140 functions to retrieve the OTP from the authenticating device. S140 may include retrieving the OTP in any manner, preferably according to how the OTP was generated and/or transmitted to the authenticating device. For example, S140 may include analyzing an OTP text message to identify an OTP, retrieving an OTP from a push notification sent to an OTP app, or receiving an OTP after generation of an OTP on the authenticating device in S130.

In one variation of a preferred embodiment, S140 includes opening an OTP generating app (distinct from the OTP app) and retrieving the OTP from the OTP generating app (e.g., by analyzing text or images displayed by the OTP generating app). For example, S140 may include identifying (e.g., in response to a push notification sent to the OTP app) that an OTP authentication event requires an OTP stored in the Google Authenticator app (which may be associated with a particular username). In this example, S140 may include opening the Google Authenticator app on the authenticating device and storing the appropriate OTP displayed by the Google Authenticator App.

S140 preferably includes storing the retrieved OTP locally on the authenticating device, but may additionally or alternatively include storing the OTP in any manner (including only in volatile memory). The retrieved OTP may be encrypted, but may additionally or alternatively not be encrypted.

S150 includes relaying the OTP to the outside service. S150 functions to deliver, in some manner, the OTP to the outside service.

S150 preferably includes delivering the OTP to the outside service by transmitting the OTP from the authenticating device to the access device, and automatically entering the OTP on the access device (from where it is passed to the outside service), but may additionally or alternatively relay the OTP to the outside service in any manner. For example, S150 may include texting the OTP to a phone number associated with the outside service and set up to receive OTPs from an application such as the OTP app.

S150 may include one or more of identifying the access device S151, transmitting the OTP to the access device S152, and populating the OTP field with the OTP S153.

S151, identifying the access device, functions to identify the access device and/or facilitator software instance to which the OTP should be sent. S151 preferably includes identifying the authenticating device using user information pre-stored in an OTP app of the authenticating device, but may additionally or alternatively include identifying the access device in any manner.

For example, S151 may include identifying an access device by prompting a user to select from a set of access device profiles stored either in the authenticating device or in a cloud database linked to the authenticating device. As another example, S151 may include identifying the access device using information transmitted to the access device in S112. For example, S112 may include transmitting information identifying a facilitator software instance (e.g., facilitator software account name and instance identifier), from which S151 may identify the access device (either at the authenticating device, or at another device such as the cloud relay).

S151 may be particularly important in cases where the OTP authentication event is detected on the authenticating device without a transmission from the access device. In such cases, S151 may include analyzing the OTP authentication event (e.g., the OTP generated, the source of the OTP, etc.) to aid in access device identification. For example, S151 may include detecting that an OTP was transmitted from a particular phone number (associated with an outside service) and sending that phone number, along with the authenticating device phone number, to a cloud relay. The cloud relay may then identify a facilitator software instance from one or both numbers (e.g., by looking up a service by the service number and looking up a facilitator software user by authenticating device phone number). As another example, S151 may include identifying an access device by analyzing the OTP source locally, and retrieving the appropriate access device profile from local and/or remote storage linked with the authenticating device (e.g., with an OTP app). For example, the OTP app may know that all OTPs received from Macys.com should direct to a particular facilitator software instance.

S151 may alternatively include identifying the access device by asking for manual user input (e.g., "Please input the MAC address of the access device used").

S151 may include identifying additional information pertaining to the access device; for example, S151 may include identifying a preferred method of notifying the access device (e.g., via the internet through a cloud relay, over a direct Bluetooth connection, etc.)

S152 includes transmitting the OTP to the access device. S152 preferably includes transmitting the OTP to the access device using a cloud-based relay, but may additionally or alternatively transmit the OTP in any manner (e.g., via a LAN, over a direct Bluetooth connection, via a cellular network, over a wired connection, etc.). Transmission of the OTP is preferably encrypted during communication to prevent inspection of the OTP by an attacker. End-to-end encryption can be used; for example, the OTP app and facilitator software can be initialized with cryptographic keys to prevent inspection of the OTP during in-flight communication from the OTP app and the facilitator software. In some embodiments, the cloud relay system may additionally be unable to inspect the OTP contents. S152 preferably includes transmitting the OTP according to information identified in S151.

S153 includes populating an OTP field with the OTP. S153 functions to enable the OTP field to be populated in response to receipt of the OTP at the access device. S153 prefer include automatically populating an OTP entry field, but may additionally or alternatively enable field population in any manner. For example, S153 may include copying the OTP to the clipboard of the access device and prompting a user to paste the OTP in a corresponding OTP field. As another example, S153 may include prompting a user to select an OTP field, and populating that field automatically after selection.

S153 may additionally include automatically submitting an authentication form that has been populated with an OTP (e.g., identifying a "submit OTP" button and selecting it after population of the OTP).

In one variation of a preferred embodiment, S153 may include authenticating a user on the access device before populating the OTP field. For example, S153 may include requesting a user to enter a password associated with the facilitator software to allow population of the OTP field. S153 may additionally or alternatively include authenticating the user in any manner (e.g., analogously to S120).

In a variation of a preferred embodiment, S150 may include transmitting additional information. For example, S150 may include relaying primary credentials (e.g., stored on an authenticating device, stored in the cloud relay platform, etc.) along with the OTP, as shown in FIG. 4. Similar to the OTP, these primary credentials (or any other information relayed in S150) may be auto-populated analogously to S153. Other examples of additional information include security question answers, private keys, credit card numbers, account information, and address information.

The method can be applied in various configurations or applications. Some preferred scenarios are shown in FIGS. 1-3, but should not be considered to be limited these implementations.

Figure 1:
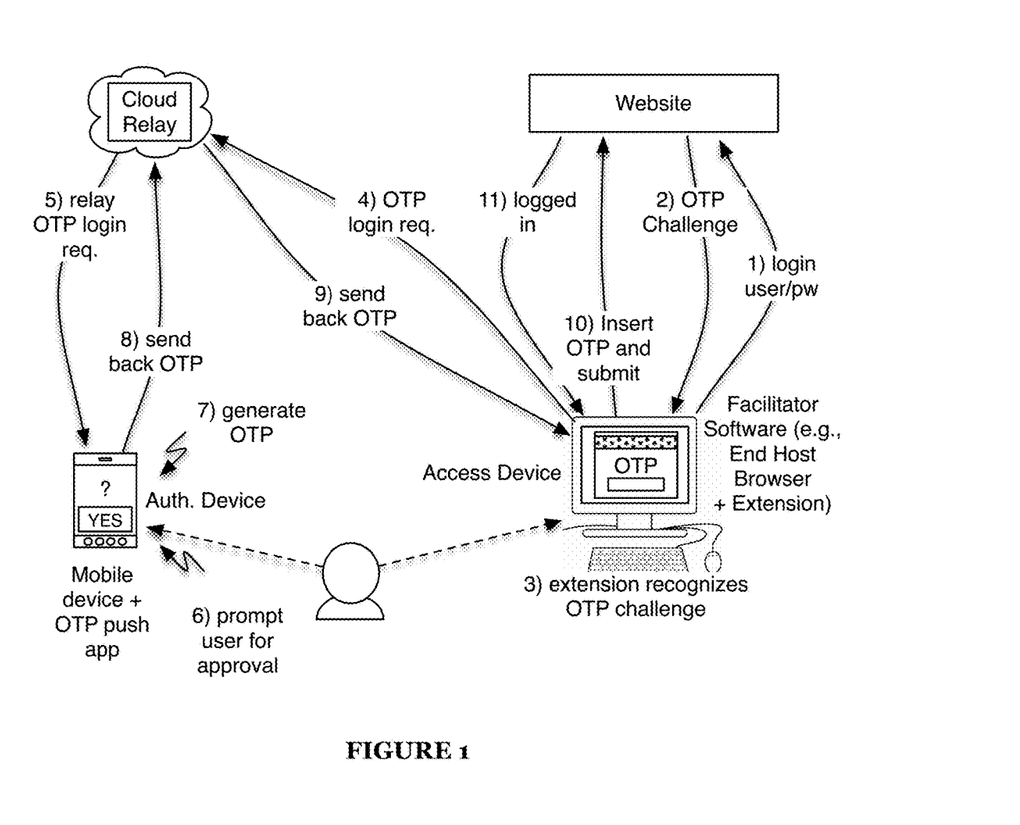
FIG. 1 is a schematic flow diagram of a method of a preferred embodiment.

As shown in FIG. 1, one example of a user login process may transpire as follows: A user uses a browser to log into a website with a username/password. The website server sends a two-factor OTP challenge back to the user. A browser extension detects the OTP challenge and initiates conversion of the OTP challenge. The browser extension notifies an OTP mobile app of the user through a cloud service. The mobile app, upon receiving the notification, prompts the user and asks the user if he would like to approve the login to the requested website. The user can tap approve (or deny, if the request is unexpected). The mobile app then generates an OTP using the appropriate algorithm for the website and relays the generated OTP to the browser extension through the cloud service. The browser extension then inputs the OTP automatically into the input field of the form for the OTP challenge. The OTP challenge form is submitted back to the website server, and the user is logged into the website successfully. In this exemplary implementation, the website took no measures to provide such app based completion. Additionally, the user completed the OTP challenge without performing manual entry of the OTP. To the user, he entered his username password, got a notification on their device, approved the request, and then was logged into the website.

As shown in FIG. 3, a similar interaction can be achieved without use of a cloud service. Bluetooth or other communication protocols can be used for direct communication between the OTP app and the facilitator software.

As shown in FIG. 2, a variation involving outside service delivery of a OTP can occur as follows: A user uses a browser to log into a website with a username/password. The website server sends initiates OTP challenge by sending a generated OTP to a mobile phone of the user. The OTP is received at the mobile phone. The mobile app detects an OTP received on behalf of the website. The mobile app prompts the user and asks the user if she would like to approve the login to the requested website. The user can tap approve (or deny, if the request is unexpected). The mobile app relays the messaged OTP to the browser extension through the cloud service. The browser extension then inputs the OTP automatically into the input field of the form for the OTP challenge. The OTP challenge form is submitted back to the website server, and the user is logged into the website successfully.

As shown in FIG. 4, a variation of the method can be applied to non OTP secure information. As one example the method can be used for entering primary credentials where the interaction can occur as follows: A user uses a browser to access a website. A browser extension detects that a login form is presented on the website and messages a mobile app through a cloud relay. The mobile app prompts the user and asks the user if she would like to approve login to the requested website. The user can tap approve (or deny). If approved, the mobile app accesses the primary credentials of the website stored on the device and relays the primary credentials to the browser extension. The browser extension then inputs the OTP automatically into the input field of the form for the OTP challenge. The OTP challenge form is submitted back to the website server, and the user is logged into the website successfully.

The system and method of the preferred embodiment and variations thereof can be embodied and/or implemented at least in part as a machine configured to receive a computer-readable medium storing computer-readable instructions. The instructions are preferably executed by computer-executable components preferably integrated with the OTP management system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:
1. A method comprising:
detecting, in response to a user access attempt on a first electronic device, a one-time passcode authentication event; wherein detecting the event comprises detecting web content referencing a one-time passcode using a browser extension operating on the first electronic device; wherein detecting the event further comprises detecting an identity of an outside service for which access is attempted;
identifying, using the outside service identity and a user identity, a second electronic device as an authenticating device; wherein the user identity is associated with the browser extension;
transmitting a notification of the one-time password authentication event from the first electronic device to the authenticating device; wherein the notification comprises OTP retrieval information, wherein:
transmitting, via one or more networks, the notification of the one-time password authentication event from the first electronic device to the authenticating device comprises transmitting, via the one or more networks, the notification from the first electronic device to a cloud relay and transmitting, via the one or more networks, the notification from the cloud relay to the authenticating device, wherein transmitting the one-time passcode from the authenticating device to the browser extension comprises transmitting the one-time passcode from the authenticating device to the cloud relay and transmitting, via the one or more networks, the one-time passcode from the cloud relay to the first electronic device, wherein identifying the second electronic device as the authenticating device comprises identifying the second electronic device at the cloud relay using a database accessible to the cloud relay;
retrieving, in response to the notification and according to the OTP retrieval information, a one-time passcode from the authenticating device;
requesting user approval input on the authenticating device;
transmitting the one-time passcode from the authenticating device to the browser extension operating on the first electronic device only after receiving the user approval input, wherein receiving the user approval input comprises:
displaying an approval interface on a display of the authenticating device, wherein the approval interface comprises information pertaining to the outside service identity and a selectable approval input indicator; and
detecting user selection of the selectable approval input indicator;
retrieving a set of stored primary credentials, the set associated with the user identity and the outside service identity;
transmitting the set of stored primary credentials to the browser extension; and
populating, using the browser extension, a one-time passcode entry form with the one-time passcode and at least one primary credential field with the set of stored primary credentials.
2. The method of claim 1, wherein the OTP retrieval information comprises information enabling the generation of the one-time passcode; the method further comprising, in response to receiving user approval input, generating the one-time passcode based on the OTP retrieval information.

3. A method comprising:
- detecting, in response to a user access attempt on an electronic access device, a one-time passcode authentication event;
- transmitting, via one or more networks, a notification of the one-time password authentication event from the electronic access device to an authenticating device, wherein the transmitting comprises transmitting, via the one or more networks, the notification from the electronic access device to a cloud relay and transmitting, via the one or more networks, the notification from the cloud relay to the authenticating device, wherein transmitting the one-time passcode from the authenticating device to a facilitator software instance comprises transmitting the one-time passcode from the authenticating device to the cloud relay and transmitting, via the one or more networks, the one-time passcode from the cloud relay to the electronic access device, wherein identifying the authenticating device comprises identifying the authentication device at the cloud relay using a database accessible to the cloud relay;
- receiving, at the authenticating device, the notification of the one-time passcode authentication event;
- retrieving, in response to the notification, the one-time passcode from the authenticating device;
- requesting user approval input on the authenticating device;
- transmitting the one-time passcode from the authenticating device to the facilitator software instance operating on the electronic access device only after receiving user approval input, wherein receiving user approval input comprises:
  - displaying an approval interface on a display of the authenticating device, wherein the approval interface comprises information pertaining to the outside service identity and a selectable approval input indicator; and
  - detecting user selection of the selectable approval input indicator;
- retrieving a set of stored primary credentials, the set associated with the user identity and the outside service identity;
- transmitting the set of stored primary credentials to the facilitator software instance; and
- enabling population, using the facilitator software instance, of a one-time passcode entry form with the one-time passcode and at least one primary credential field with the set of stored primary credentials.

4. The method of claim 3, wherein the electronic access device comprises the authentication device.

5. The method of claim 3, wherein detecting the one-time passcode authentication event comprises monitoring incoming communications at the authenticating device, analyzing the incoming communications at the authenticating device for OTP authentication information, and detecting the one-time passcode authentication event, at the authenticating device, from the OTP authentication information; wherein the incoming messages are sent from an outside service.

6. The method of claim 5, further comprising identifying the electronic access device based on at least one of an identity of the outside service and user input at the authenticating device.

7. The method of claim 3, wherein detecting the one-time passcode authentication event comprises detecting, using the facilitator software instance, the one-time passcode authentication event at the electronic access device.

8. The method of claim 7, wherein detecting the one-time passcode authentication event comprises monitoring user web browser usage; analyzing web content; and identifying the one-time passcode authentication event based on the web content.

9. The method of claim 7, wherein detecting the one-time passcode authentication event comprises receiving manual notification from a user that the one-time passcode authentication event has occurred.

10. The method of claim 7, further comprising requesting user approval input on the authenticating device; wherein transmitting the one-time passcode comprises transmitting the one-time passcode only after receiving the user approval input on the authenticating device.

11. The method of claim 10, wherein receiving user approval input comprises receiving a biometric identifier of an authorized user of the authenticating device.

12. The method of claim 7, further comprising generating, based on the notification, the one-time passcode at the authenticating device.

13. The method of claim 7, wherein retrieving the one-time passcode comprises monitoring incoming communications at the authenticating device, analyzing the incoming communications at the authenticating device for the one-time passcode, and retrieving the one-time passcode from at least one of the incoming communications.

14. The method of claim 7, wherein retrieving the one-time passcode comprises opening an OTP generating application and retrieving the one-time passcode from the OTP generating application.

15. The method of claim 7, wherein enabling population comprises storing the one-time passcode in a copy-paste clipboard of the electronic access device.

16. The method of claim 7, wherein enabling population comprises prompting a user of the electronic access device to select a field for OTP entry and in response to the selection of the field by the user, filling the field with the one-time passcode.

17. The method of claim 7, wherein enabling population comprises enabling population only after a user of the electronic access device has authenticated with the facilitator software instance.

* * * * *